(12) United States Patent
Humphrey et al.

(10) Patent No.: US 8,067,857 B2
(45) Date of Patent: Nov. 29, 2011

(54) REDUNDANT POWER SUPPLY SYSTEMS AND METHODS

(75) Inventors: Daniel Humphrey, Houston, TX (US); Reynaldo P. Domingo, Spring, TX (US); Mohamed Amin Bemat, Cypress, TX (US); Xiqun Zhu, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 246 days.

(21) Appl. No.: 12/512,017

(22) Filed: Jul. 29, 2009

(65) Prior Publication Data

US 2011/0025129 A1  Feb. 3, 2011

(51) Int. Cl.
*H02J 1/00* (2006.01)
(52) U.S. Cl. ......................................... 307/82
(58) Field of Classification Search ............ 307/82, 307/52, 80; 700/286, 287, 291, 292, 293, 700/294, 295; 363/65
See application file for complete search history.

(56) References Cited

U.S. PATENT DOCUMENTS

| | | | |
|---|---|---|---|
| 4,860,188 A | 8/1989 | Bailey | |
| 5,200,643 A | 4/1993 | Brown | |
| 5,675,480 A | 10/1997 | Sanford | |
| 5,682,303 A * | 10/1997 | Goad | 363/71 |
| 5,737,202 A * | 4/1998 | Shimamori | 363/65 |
| 5,894,413 A | 4/1999 | Ferguson | |
| 5,905,645 A * | 5/1999 | Cross | 363/65 |
| 6,381,155 B1 * | 4/2002 | Kadatsky et al. | 363/65 |
| 6,614,133 B2 | 9/2003 | Belson et al. | |
| 6,630,750 B2 * | 10/2003 | McAndrews | 307/64 |
| 7,082,042 B2 | 7/2006 | Harris | |
| 7,284,140 B2 * | 10/2007 | Suzuki et al. | 713/340 |
| 7,368,832 B2 | 5/2008 | Peck | |
| 7,436,950 B2 * | 10/2008 | Chheda et al. | 379/413 |
| 7,638,899 B2 * | 12/2009 | Tracy et al. | 307/65 |
| 2004/0036359 A1 | 2/2004 | Griffith et al. | |
| 2006/0167569 A1 * | 7/2006 | Colombi et al. | 700/22 |
| 2008/0191552 A1 | 8/2008 | Suzuki | |
| 2009/0305087 A1 * | 12/2009 | Rajashekara et al. | 429/13 |
| 2010/0013307 A1 * | 1/2010 | Heineman et al. | 307/33 |

* cited by examiner

*Primary Examiner* — Jared Fureman
*Assistant Examiner* — Daniel Cavallari
(74) *Attorney, Agent, or Firm* — Michael S. Czarnecki

(57) ABSTRACT

A redundant power supply method is provided. The method includes communicatively coupling a load to a first source via a plurality of first power supplies and to a second source via a plurality of second power supplies. The method further includes bi-directionally communicatively coupling a controller to the plurality of first power supplies and to the plurality of second power supplies. The method includes activating a first portion of the plurality of first power supplies to supply power to the load, wherein the controller determines the number ("N") of first power supplies activated, and activating at least one of the plurality of second power supplies to supply power to the load. The method also includes monitoring for at least one fault condition in each of the active first power supplies and in each of the active second power supplies.

11 Claims, 5 Drawing Sheets

REDUNDANT POWER SUPPLY SYSTEMS AND METHODS

CROSS-REFERENCE TO RELATED APPLICATIONS

The present application is related to co-pending U.S. patent application Ser. No. 12/491,773 entitled "Multiple Power Supply Control," filed on 25 Jun. 2009 by inventors Daniel Humphrey, Mohamed Amin Bemat, and Reynaldo P. Domingo, and owned by the same assignee now and at the time of invention.

BACKGROUND OF THE INVENTION

Description of the Related Art

This section is intended to introduce the reader to various aspects of art which may be related to one or more aspects of the present invention as described and claimed below. This discussion is believed helpful in providing the reader with background information, thereby facilitating a better understanding of various aspects of the present invention. Accordingly, it should be understood by the reader that the provided information should be read in this light and not as an admission of any prior art.

Redundant power supplies are often used where high reliability and nearly continuous availability of power is of primary importance. In such "mission critical" applications, it is not uncommon to have simultaneously online both a primary supply system and a redundant secondary supply system, with both systems capable of meeting the full demand presented by the load. While such a system provides significant protection from unexpected power supply interruption, the requirement to continuously maintain twice the required number of power supplies online significantly impacts the overall energy efficiency of each power supply, since the efficiency of a power supply is generally proportionate to the overall demand placed upon the supply. In other words, power supply efficiency, measured as a ratio of power supplied divided by power demand, tends to increase as the power demand increases.

Dynamic power savings can be used to improve the overall energy efficiency of systems using redundant power supplies. With dynamic power savings, rather than requiring all of the primary and secondary power supplies continuously online, only the power supplies necessary to support the load demand are placed continuously online. By way of an illustrative example, assume a system with a load having a maximum demand of 5,000 watts (5 kW), five (5) primary 1,000 watt (1 kW) power supplies, and five secondary 1 kW power supplies. Without dynamic power savings at a load demand of 3 kW, all ten supplies (five primary supplies+five secondary supplies) would continuously operate with each carrying approximately 10% (~300 watts/each) of the load. With dynamic power savings, at a load demand of 3 kW, only six supplies (three primary supplies+three secondary supplies) would continuously operate, each carrying approximately 17% (~500 watts/each) of the load. Thus, dynamic power savings generally increases overall system efficiency by increasing the load present on each of the independent power supplies comprising the system.

SUMMARY OF THE INVENTION

A redundant power supply method is provided. The method includes communicatively coupling a load to a first source via a plurality of first power supplies and to a second source via a plurality of second power supplies. The method further includes bi-directionally communicatively coupling a controller to the plurality of first power supplies and to the plurality of second power supplies. The method includes activating a first portion of the plurality of first power supplies to supply power to the load, wherein the controller determines the number ("N") of first power supplies activated, and activating at least one of the plurality of second power supplies to supply power to the load. The method also includes monitoring for at least one fault condition in each of the active first power supplies and in each of the active second power supplies.

A redundant power supply system is also provided. The system can include a load suitable for providing a variable demand, at least one of a plurality of first power supplies communicatively coupling a first source to the load, at least one of a plurality of second power supplies communicatively coupling a second source to the load, and at least one controller bi-directionally communicatively coupled to at least a portion of said first and at least a portion of said second power supplies. The controller can be adapted to activate and deactivate at least a portion of the plurality of first power supplies in response to changes the variable demand presented by the load. The controller can also be adapted to monitor for at least one failure mode for at least a portion of the plurality of first power supplies and at least a portion of the second power supplies.

Another redundant power supply method is also provided. The method can include communicatively coupling a first source to a plurality of first power supplies, communicatively coupling a second source to a plurality of second power supplies, and communicatively coupling at least one controller to the plurality of first power supplies and the plurality of second power supplies. The communicative coupling between each of the first power supplies, each of the second power supplies, and the at least one controller can include: a power supply input failure signal; a power supply output failure signal; a power supply activation signal, adapted to transition the power supply from a deactivated state to an activated state; and a power supply deactivation signal, adapted to transition the power supply from an activated state to a deactivated state. The method can also include monitoring, via the controller, for a power supply input failure signal or a power supply output failure signal from each of the first power supplies and each of the second power supplies. The method includes having the controller respond to the receipt of a power supply input failure signal from at least one first power supply by transmitting a power supply activation signal to at least a portion of the plurality of second power supplies, and transmitting a power supply deactivation signal to the plurality of first power supplies. The method further includes having the controller respond to the receipt of a power supply output failure signal from at least one first power supply by transmitting a power supply activation signal to at least a portion of the plurality of second power supplies and transmitting a power supply deactivation signal to the at least one first power supply generating the power supply output failure signal.

As used herein, the term "power supply" and the plural "power supplies" can refer to any device, system, or combination of systems and/or devices suitable for the conversion of a power input to one or more desired power outputs. Such conversion process can include one or more of the following services on the power input, power output, or both power input and power output characteristics: AC-to-DC rectification, voltage regulation, current regulation, overcurrent protection, current filtering, frequency shifting, frequency filtering, frequency regulation, and voltage filtering. A non-limiting, exemplary, power supply can be found inside of a personal computer. Such a power supply can be used to convert 120 or 220 volt household alternating current to 12 volt direct current, 5 volt direct current, and 3.3 volt direct current for use by various components disposed within the computing device.

BRIEF DESCRIPTION OF THE DRAWINGS

So that the manner in which the above recited features can be understood in detail, a more particular detailed description, briefly summarized above, may be had by reference to one or more exemplary embodiments, some of which are illustrated in the appended drawings. It is to be noted, however, that the appended drawings illustrate only typical embodiments and therefore should not be considered or construed as limiting of its scope, for other equally effective embodiments as claimed herein may exist.

Advantages of one or more disclosed embodiments may become apparent upon reading the following detailed description and upon reference to the drawings in which.

DETAILED DESCRIPTION

Figure 1:
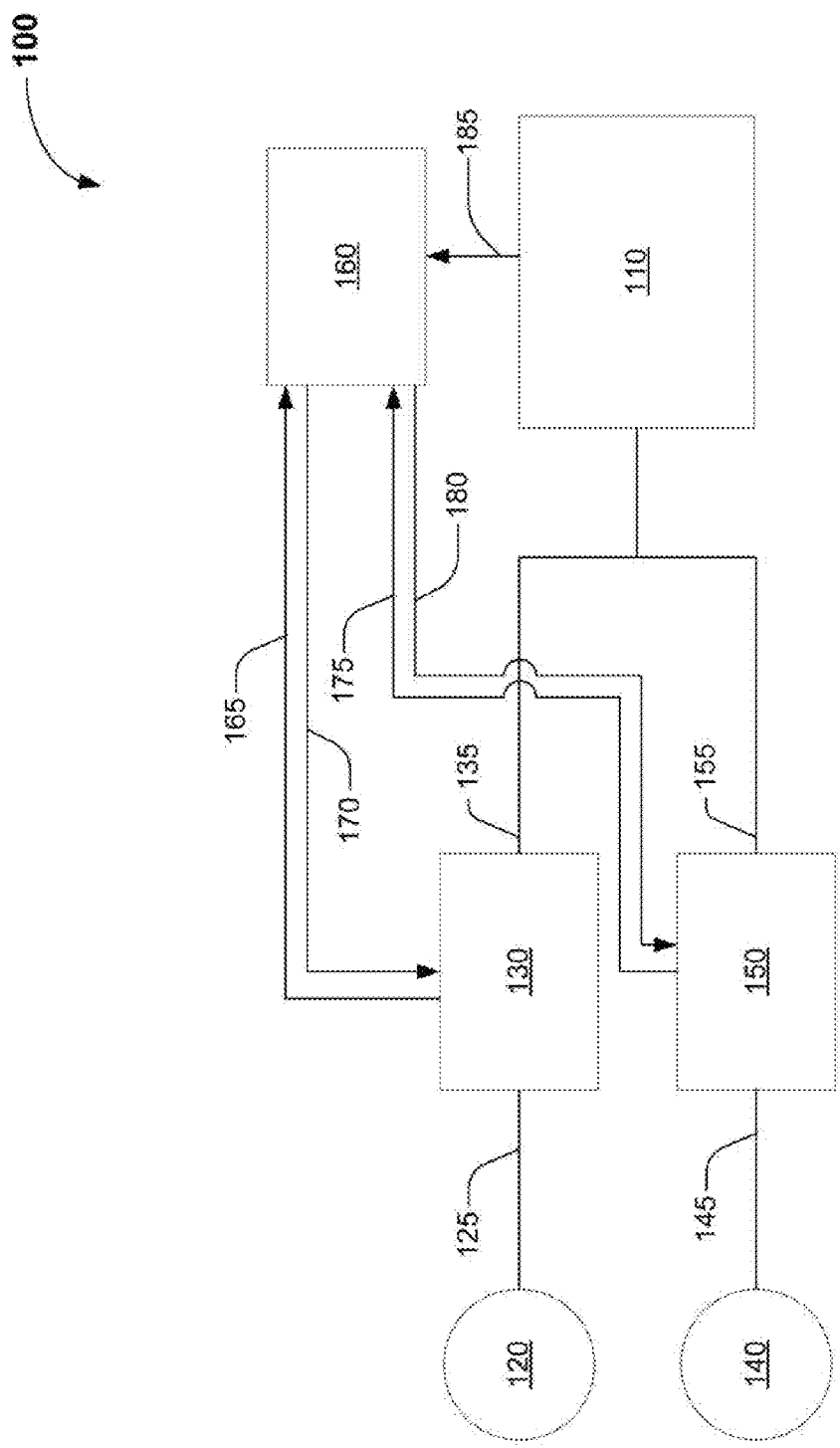
FIG. 1 depicts an illustrative redundant power supply system, according to one or more embodiments described herein.

FIG. 1 depicts an illustrative redundant power supply system 100, according to one or more embodiments. The redundant power supply system 100 can include, but is not limited to, a load 110 communicatively coupled to a first source 120 via one or more first power supplies 130, and communicatively coupled to a second source 140 via one or more second power supplies 150. Although not depicted in FIG. 1, in one or more embodiments, the first source 120 can be the same as the second source 140. The redundant power supply system 100 can also include a controller 160 having one or more signal outputs (two are depicted in FIG. 1, 170 and 180) and one or more signal inputs (three are depicted in FIG. 1, 165, 175, and 185).

Although the redundant power supply system 100 will be discussed within the context of an electronic computing device, it should be noted that similar embodiments can also include virtually any electrically powered load 110 having power provided using one or more first power supplies 130 and one or more second power supplies 150.

The load 110 can include any system, device, or any combination of systems and/or devices requiring electrical power. In one or more embodiments, the load 110 can be a computing device requiring a high degree of reliability and near continuous up-time, for example a desktop computer, computer workstation, or rack mounted server. In one or more embodiments, the load 110 can have one or more power requirements, for example, the load 110 can have a first class of devices operating at a low voltage, a second class of devices operating at an intermediate voltage, and a third class of devices operating at a high voltage. In one or more specific embodiments, the load 110 can include one or more rack mounted servers having a first class of devices operating at a low voltage, for example a personal computer interface ("PCI") card, an advanced graphics port ("AGP") card, a central processing unit ("CPU"), or a dual in-line memory module ("DIMM") operating at 3.3 volts DC; a second class of devices operating at an intermediate voltage, for example a personal computer interface ("PCI") card, an advanced graphics port ("AGP") card, a central processing unit ("CPU"), or a dual in-line memory module ("DIMM") operating at 5 volts DC; and a third class of devices operating at a high voltage, for example a hard disk drive ("HDD") or similar storage media operating at 12 volts DC.

The load 110 can be a fixed or variable demand load. A fixed demand load can provide a substantially constant power demand, whereas the power demand for a variable demand load can fluctuate over time as processes within the load are initiated or halted. The load 110 can be an alternating current ("AC") load, a direct current ("DC") load, or any combination thereof. The load 110 can have any power demand, for example the load 110 can have a power demand of about 100 W or more; about 1,000 W or more; about 2,000 W or more; about 5,000 W or more; or about 10,000 W or more. The load can draw power from a plurality of power sources, for example a first source 120 and a second source 140.

The first source 120 can include any system, device or combination of systems and/or devices suitable for providing electrical power. In most instances, the power provided by the first source 120 may not be of suitable voltage or waveform for use by the load 110, therefore the power supplied by the first source 120 can be introduced to one or more first power supplies 130, for conversion to a voltage and/or waveform suitable for consumption or use by the load 110. In one or more embodiments, the first source 120 can be a commercial electrical distribution grid operating at one or more standard voltages, for example a 120 VAC (single phase) or 240 VAC (multi-phase) distribution system found in some residential, commercial, and industrial data centers. In one or more embodiments, all or a portion of the first source 120 can be provided using uninterruptible power supply, for example a power supply backed by a generator or other energy storage or energy producing device.

Similar to the first source 120, the second source 140 can include one or more systems, devices or any combination of systems and/or devices suitable for providing electrical power. In most instances, the power provided by the second source 140 may not be of suitable voltage or waveform for direct use by the load 110, therefore the power supplied by the second source 140 can be introduced to one or more second power supplies 150, for conversion to a voltage and/or waveform suitable for consumption or use by the load 110. In one or more embodiments, the second source 140 can be a commercial electrical distribution grid operating at one or more standard voltages, for example a 120 VAC (single phase) or 240 VAC (multi-phase) distribution system found in some residential, commercial, and industrial data centers. In one or more embodiments, all or a portion of the second source 140 can be provided using uninterruptible power supply, for example a power supply backed by a generator or other energy storage or energy producing device.

In one or more specific embodiments, the first source 120 and the second source 140 can share a common power source, for example the first source 120 can be a first tap and the second source 140 can be a second tap off a common feed bus. In one or more specific embodiments, the first source 120 can be a power source independent from the second source 140, for example the first source 120 can be tapped off a first feed bus and the second source 140 can be tapped off an independent second feed bus. In one or more specific embodiments, either, or both, the first source 120 and/or the second source 140 can be at least partially backed with one or more standby power sources, for example an uninterruptible power supply or a generator.

The first source 120 can be coupled to one or more first power supplies 130 via one or more conduits 125. The one or more first power supplies 130 can be coupled to the load via one or more conduits 135. Each of the one or more first power supplies 130 can include, but is not limited to, a system that can perform one or more functions, for example adjusting the voltage of the power supplied by the first source 120; adjusting the waveform of the power supplied by the first source 120, filtering one or more frequencies or frequency bands from the power supplied by the first source 120; and conditioning the power supplied by the first source 120.

The second source 140 can likewise be coupled to one or more second power supplies 150 using one or more conduits 145. The one or more second power supplies 140 can, in turn, be coupled to the load 110 using one or more conduits 155. Each of the one or more second power supplies 150 can include, but is not limited to, a system that can perform one or more functions, for example adjusting the voltage of the power supplied by the second source 140; adjusting the waveform of the power supplied by the second source 140, filtering one or more frequencies or frequency bands from the power supplied by the second source 140; and conditioning the power supplied by the second source 140.

As used herein, the term "couple" or "coupled" can refer to any form of direct, indirect, optical or wireless electrical connection. The electrical connection can, in one or more embodiments, include, but is not limited to any electrically conductive or magnetically inductive connection linking two or more devices. The connection can be electrically conductive, for example using one or more conductors such as copper or aluminum wire, conductive strips on a printed circuit board, or the like to connect two or more components. The connection can be magnetically inductive, for example, stimulating the flow of current from a transformer secondary coil by passing a current through a primary coil inductively coupled to the secondary coil. The connection can be electromagnetic for example by controlling current flow through a relay contact via an independent relay coil such that passage of a current through the relay coil can magnetically open and close the relay contact.

As used herein, the terms "conduit" and the plural "conduits" can refer to any system or device suitable for sustaining the flow of electrical energy therethrough. In one or more embodiments, the term "conduit" can refer to any wired or wireless means for transmission of electrical energy at any voltage or current. In one or more specific embodiments, the term "conduit" can refer to one or more solid or hollow conductors formed using one or more conductive or superconductive materials, including, but not limited to copper, copper alloys, aluminum, aluminum alloys, nickel, nickel alloys, gold, gold alloys, silver, silver alloys, cuprate-perovskite ceramics ("high temperature superconductors"), or any combination thereof. In one or more embodiments, the term "conduit" can refer to conductors printed or otherwise deposited, layered, soldered, or disposed on single or multi-layer printed circuit boards.

In one or more embodiments, the capacity of each of the power supplies providing the one or more first power supplies 130 and one or more second power supplies 150 may be individually insufficient to meet the peak power demand of the load 110, for example, each of the power supplies might be rated for a maximum power output of about 1,000 watts (1 kW), where the load may have a peak demand of 5,000 watts (5 kW). To accommodate the peak demand of the load 110, multiple first power supplies 130 can be operatively coupled, for example, to accommodate a load having a peak demand of 5 kW, a total of five 1 kW power supplies 130 can be operatively coupled in parallel. Where multiple first power supplies 130 are connected in parallel to meet the peak demand of the load 110, the total number of first power supplies can be referred to by the letter "N," so for the preceding example, N=5. Similarly, multiple second power supplies 150 can be operatively coupled to meet the peak demand of the load 110. Such an arrangement, where "N" first power supplies 130 and "N" second power supplies are coupled to the load 110 can be referred to as an "N+N" arrangement.

The controller 160 can be communicatively coupled to the load 110 via one or more conduits 185, at least a portion of the one or more first power supplies 130 via one or more conduits 165, 170, and at least a portion of the second power supplies 150 via one or more conduits 175, 180. In one or more embodiments, the controller 160 can continuously or intermittently monitor one or more load 110 parameters. In one or more specific embodiments, the controller 160 can continuously or intermittently monitor the power demand of the load 110. In response to the changing power demand of the load 110, the controller 160 can variously activate or deactivate all or a portion of the one or more first power supplies 130. For example, when the power demand exerted by the load 110 increases, the controller can sense the increase via one or more signals transmitted via the conduit 185. In response, the controller 160 can activate one or more first power supplies 130 via one or more activation signals transmitted to the respective first power supplies 130 via the conduit 170.

As used herein, the terms "activate," "activation," and "activated" refer to any process or method by which a power supply can commence or otherwise initiate power output. The power output of the power supply, when activated, can range from about 0% to about 100% of the rated power supply output capacity.

As used herein, the terms "deactivate," "deactivation," and "deactivated" refer to any process or method by which a power supply can halt the or otherwise terminate power output. The power output of the power supply, when deactivated, can be about 0% of the rated power supply output capacity. Deactivation can occur through interruption of the power input and/or power output using a mechanical, electrical, electro-mechanical, or semiconductor switching device. In one or more embodiments, deactivation can occur through interruption of one or more systems or controls within the power supply.

In one or more embodiments, one or more signals indicating the status of each of the one or more first power supplies 130 can be transmitted to the controller 160 via the conduit 165. Similarly, one or more signals indicating the status of each of the one or more second power supplies 150 can be transmitted to the controller 160 via the conduit 175. The one or more signals transmitted or otherwise communicated to the controller 160 via the conduits 165 and 175 can include, but are not limited to, one or more signals indicating the status of the input to each power supply, i.e. indicating a potential source failure; the status of the output from each power supply, i.e. indicating a potential power supply failure; and/or the performance of one or more internal devices, systems and/or controls within the power supply.

Where an "N+N" redundancy is being used, the controller 160 can also activate a similar number of second power supplies 150 via one or more activation signals transmitted to all or a portion of the second power supplies 150 via the conduit 180. In one or more embodiments, the controller can deactivate one or more first power supplies 130 and one or more second power supplies 150 via one or more deactivation signals transmitted to all or a portion of the second power supplies 150 via the conduit 180. Transmission of one or more deactivation signals can be, for example, in response to a decrease in the power demand of the load 110 as measured by the controller 160.

Using an "N+N" redundant power supply arrangement, where a sufficient number of first power supplies 130, i.e. "N" first power supplies 130, and a like number of second power supplies 150, i.e. "N" second power supplies 150, are required to be active to provide redundancy. Such an arrangement effectively halves the load carried by each active first and second power supply. For example, assuming a 10 kW maximum load 110 and 2 kW power supplies, five first power supplies 130 and five second power supplies 150 would be required to achieve N+N redundancy. At a power demand of 8 kW, four first power supplies and all four second power supplies would be active, each power supply operating at approximately 50% load.

In one or more specific embodiments, an "N+1" redundancy scheme can provide a reliable power supply to the load 110. Using an "N+1" redundancy scheme the controller 160 can activate the number of first power supplies 130 necessary to support the load 110, i.e. "N" first power supplies 130, and only one second power supply 150. At a power demand of 8 kW, the controller can activate four 2 kW first power supplies 130 and one 2 kW second power supply 150. With only five power supplies activated, each power supply will now operate at approximately 80% load (8 kW (load)/10 kW (5×2 kW active power supplies). Thus, an N+1 arrangement can significantly increase the load of each active power supply coupled to the load 110. Since overall efficiency increase of each power supply can be proportionate to the load placed upon the power supply, five power supplies operating at 80% load will generally operate more efficiently than eight power supplies operating at 50% load, even though the total power delivered to the load 110 remains the same.

Figure 2:
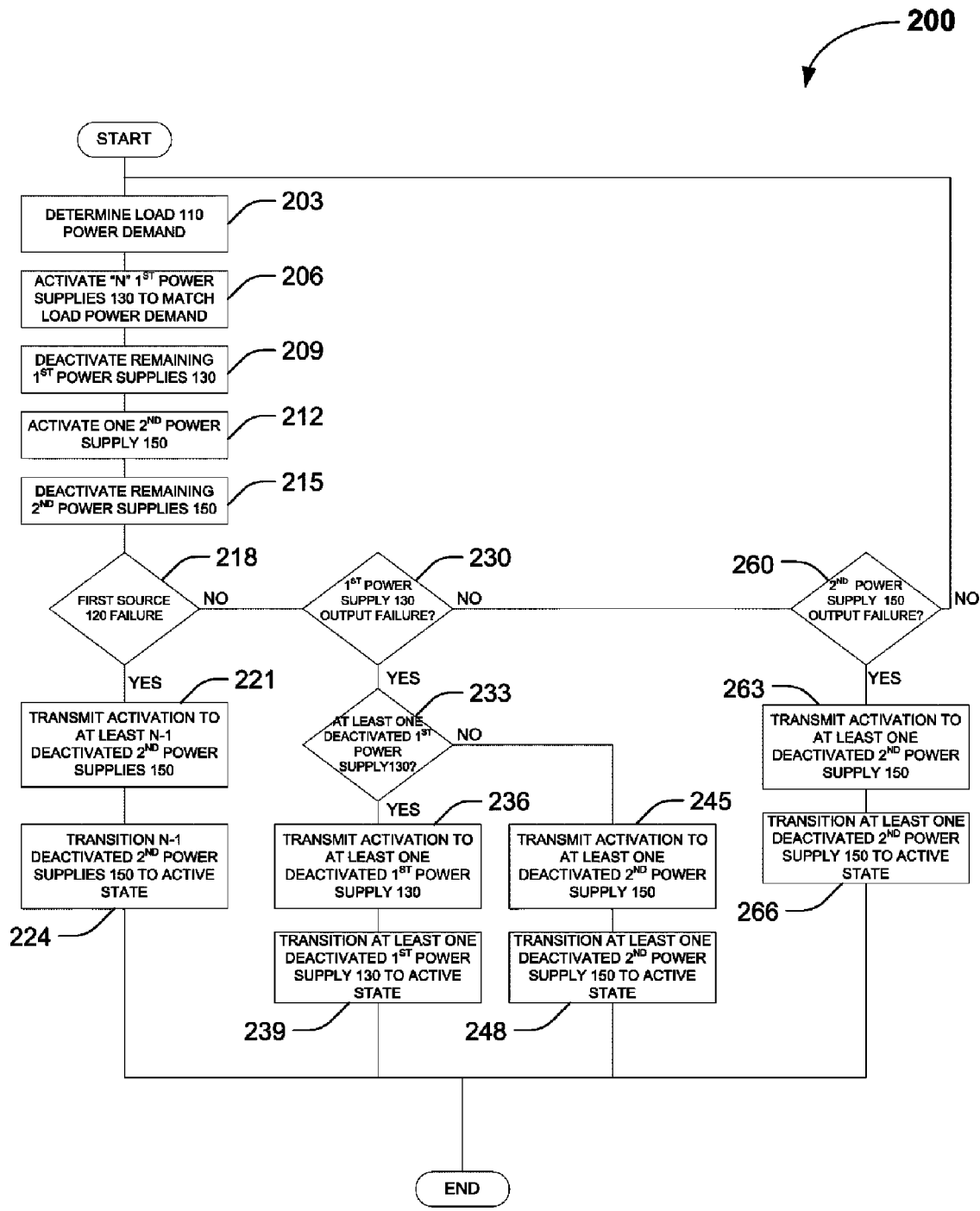
FIG. 2 depicts an illustrative logic flow diagram for an exemplary redundant power supply system, according to one or more embodiments described herein.

FIG. 2 depicts an illustrative logic flow diagram 200 for an exemplary redundant power supply system, according to one or more embodiments. The logic flow diagram 200 illustrates an exemplary method for providing redundancy using an N+1 power supply arrangement. In such an arrangement, the required number of first power supplies 130 and the required number of second power supplies 150 can be determined by the peak demand of the attached load 110. The controller 160 can be communicatively coupled to the load 110 and to each of the first power supplies 130 and the second power supplies 150. The controller 160 can monitor one or more load parameters via signals transmitted via conduit 185, one or more first power supply 130 parameters via signals transmitted via conduit 165, and one or more second power supply 150 parameters via signals transmitted via conduit 175. The controller 160 can activate and deactivate each of the first power supplies 130 via one or more activation or deactivation signals transmitted via conduit 170, and each of the second power supplies 150 via one or more activation or deactivation signals transmitted via conduit 180.

The method 200 can begin at 203 with the controller 160 determining the load 110 power demand. Based on the power demand of the load 110, at 206, the controller 160 can transmit or otherwise communicate one or more activation signals to an appropriate number of first power supplies 130 via conduit 170. For example, if the load 110 communicates or otherwise transmits a power demand of 6 kW to the controller 160, the controller 160 would activate a total of three 2 kW rated first power supplies 130 to supply sufficient power to the load.

At 209 the controller 160 can communicate or otherwise transmit one or more deactivation signals to any first power supplies 130 not activated at 206. At 212 the controller 160 can communicate or otherwise transmit one or more activation signals to a single second power supply 150. At 215 the controller 160 can communicate or otherwise transmit one or more deactivation signals to any second power supplies 150 not activated at 212. After the controller 160 activates the appropriate number of first power supplies 130 and one second power supply 150, an "N+1" power supply arrangement can be established. After establishing the "N+1" power supply arrangement, the controller 160 can monitor for one or more system failures, for example a failure of the first or second sources 120, 140 or a failure of one or more first or second power supplies 130, 150.

At 218 the controller 160 can determine whether a first source 120 failure has occurred. The failure of the first source 120 can include any number of failure modes, for example: a complete loss of voltage, current, and/or frequency, or a deviation any parameter outside of pre-established limits exceeding a pre-determined temporal threshold. For example, a first source 120 failure can include, but is not limited to, voltage sag, voltage spike, frequency shift, or a complete failure of the first source 120. In one or more embodiments, if a first source 120 failure has occurred, the controller 160 can communicate or otherwise transmit one or more activation signals to transition N−1 deactivated second power supplies 150 to an active state.

In the event of a first source 120 failure, the controller 160 can transmit one or more activation signals to the second power supply at 221. Upon receipt of the one or more activation signals by the second power supply 150, the output voltage of the second power supply 150 can begin to increase or "ramp-up." In one or more embodiments, the transition from the first source 120 to the second source 140 can be transparent to the load 110 when the "ramp-up" time of the second power supply 150 is less than or equal to the "run-down" or "wind-down" time of the failed first power supply 130. The concepts of "run-down" and "ramp-up" are discussed in greater detail in FIG. 3 which depicts an illustrative timing diagram 300 for an exemplary redundant power supply system, according to one or more embodiments. The timing diagram 300 depicts an exemplary temporal relationship between the "run-down" time 310 of an illustrative first power supply 130 and the "ramp-up" time 320 of an illustrative second power supply 150.

In one or more embodiments, the input voltage 340 supplied to the first power supply 130 by the first source 120 can drop to an unacceptable level at time $t_1$, for example the input voltage 340 can drop to about zero (0) volts. When the first source 120 voltage is removed, the output voltage 350 of the first power supply 130 can begin to decay at time $t_1$. The output voltage 350 of the first power supply 130 can drop to an unacceptable level, i.e. a level insufficient to support the operation of the load 110, at or after time $t_2$.

Upon receiving one or more signals indicating the failure of the first source 120, the controller 160 can provide one or more activation signals 360 to the second power supply 150 at time $t_1$. The input voltage 370 supplied to the second power supply 150 can be maintained at an acceptable operating level, for example 120 VAC or 240 VAC at all times. The output voltage 380 of the second power supply 150 can begin to increase upon receipt of the activation signal from the controller 160 at time $t_1$. The output voltage 380 of the second power supply 150 can reach an acceptable level, i.e. a level sufficient to support the operation of the load 110, at or before time $t_2$. The input voltage 390 to the load 110 remains at an acceptable level throughout the transition from the first power supply 130 to the second power supply 150 when the "ramp-up" time 320 of the second power supply 150 is less than or equal to the "run-down" time 310 of the first power supply 130.

Referring back to FIG. 2, if a first source 120 failure is not detected at 218, the controller can determine whether an output failure has occurred on the first power supply 130 at 230. Upon detecting a first power supply 130 output failure at 230, the controller can determine whether one or more deactivated first power supplies 130 are available at 233. If at least one deactivated first power supply 130 is available, the controller 160 can transmit or otherwise communicate one or more activation signals to at least one deactivated first power supply 130 at 236. At 239, the deactivated first power supply can transition to the active state. In this instance, the load 110 continues to receive adequate power at all times since the single active second power supply 150 (ref. at 212) can temporarily replace the failed first power supply 130 while the controller 160 transitions one or more deactivated first power supplies 130 to an active state at 233 and 236.

If at least one deactivated first power supply 130 is not available at 233, the controller 160 can transmit or otherwise communicate one or more activation signals to at least one deactivated second power supply 150 at 245. At 248, the deactivated second power supply 150 can transition to the active state. In this instance, the load 110 continues to receive adequate power at all times since the single active second power supply 150 (ref. at 212) can temporarily replace the failed first power supply 130 while the controller 160 transitions one or more deactivated second power supplies 150 to an active state at 245 and 248.

If a first source 120 failure is not detected at 218, the controller can determine whether an output failure has occurred on the second power supply 130 at 260. If a second power supply 150 output failure is detected by the controller at 260, the controller can determine whether one or more deactivated second power supplies 150 are available at 263. If at least one deactivated second power supply 150 is available, the controller 160 can transmit or otherwise communicate one or more activation signals to at least one deactivated second power supply 150 at 263. At 266, the deactivated second power supply 150 can transition to the active state. In this instance, the load 110 continues to receive adequate power at all times since the first power supply 130 (ref. 206) can temporarily provide adequate power to the load while the controller 160 transitions one or more deactivated second power supplies 150 to an active state at 263 and 266.

Figure 4:
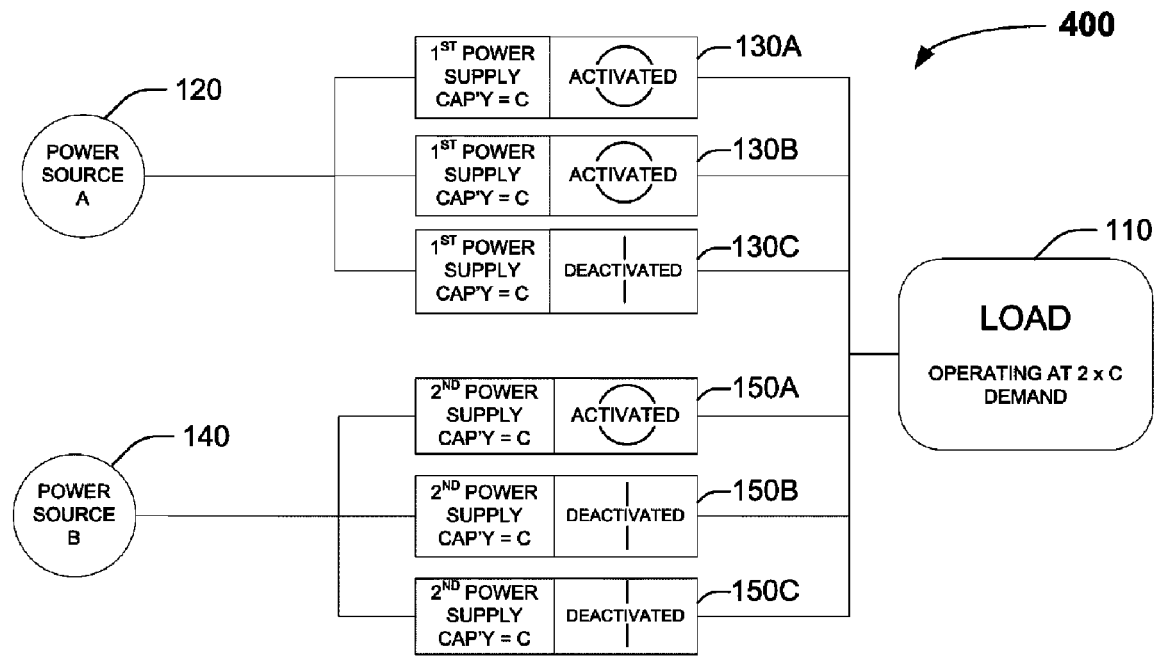
FIG. 4 depicts an illustrative N+1 redundant power supply system with an illustrative output fault, according to one or more embodiments described herein.
Figure 4A:
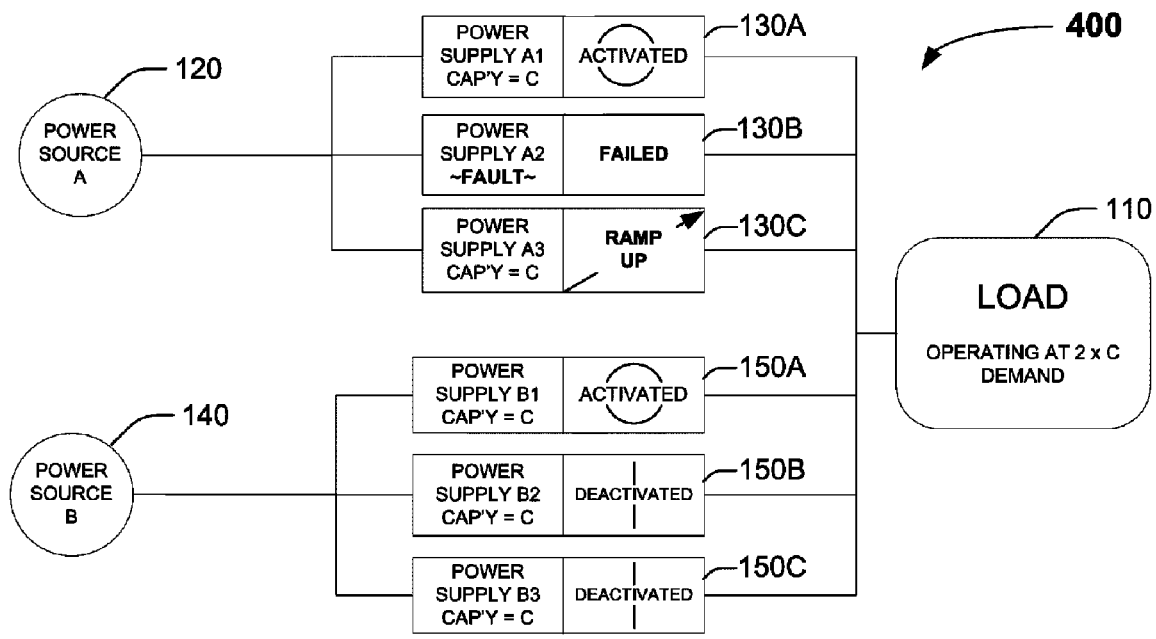
FIG. 4A depicts the illustrative N+1 redundant power supply system depicted in FIG. 4 responding to a power supply output failure, according to one or more embodiments described herein.

FIG. 4 depicts an illustrative "N+1" redundant power supply system 400, according to one or more embodiments. FIG. 4A depicts the illustrative "N+1" redundant power supply system 400 depicted in FIG. 4 responding to first power supply 130B output failure, according to one or more embodiments. FIGS. 4 and 4A depict three first power supplies 130A, 130B, and 130C, each having a capacity of "C" and three second power supplies 150A, 150B, and 150C, each also having a capacity of "C" coupled to a load 110 having a maximum power demand of "3C." Using an "N+1" redundancy arrangement, and assuming dynamic power savings are employed, when the load 110 is operating at a power demand of "2C," two first power supplies 130A and 130B and one second power supply 150A can be activated. Under the "N+1" redundancy arrangement depicted in FIGS. 4, one first power supply 130C and two second power supplies 150B and 150C can be maintained in a deactivated state by the controller 160 (not shown).

The controller 160 can detect the failure of first power supply 130B via one or more signals transmitted or otherwise communicated via the conduit 165. In response to the failure, the controller 160 can transmit or otherwise communicate one or more activation signals to the deactivated first power supply 130C via the conduit 170. As depicted in FIG. 4A, the power supplied to the load 110 remains sufficient at all times, supplied by the first power supply 130A and the second power supply 150A. After the output voltage of the first power supply 130C reaches a level sufficient to power the load 110 (i.e. completes "ramping-up"), the system 400 again can operate under an "N+1" redundancy arrangement.

Figure 5:
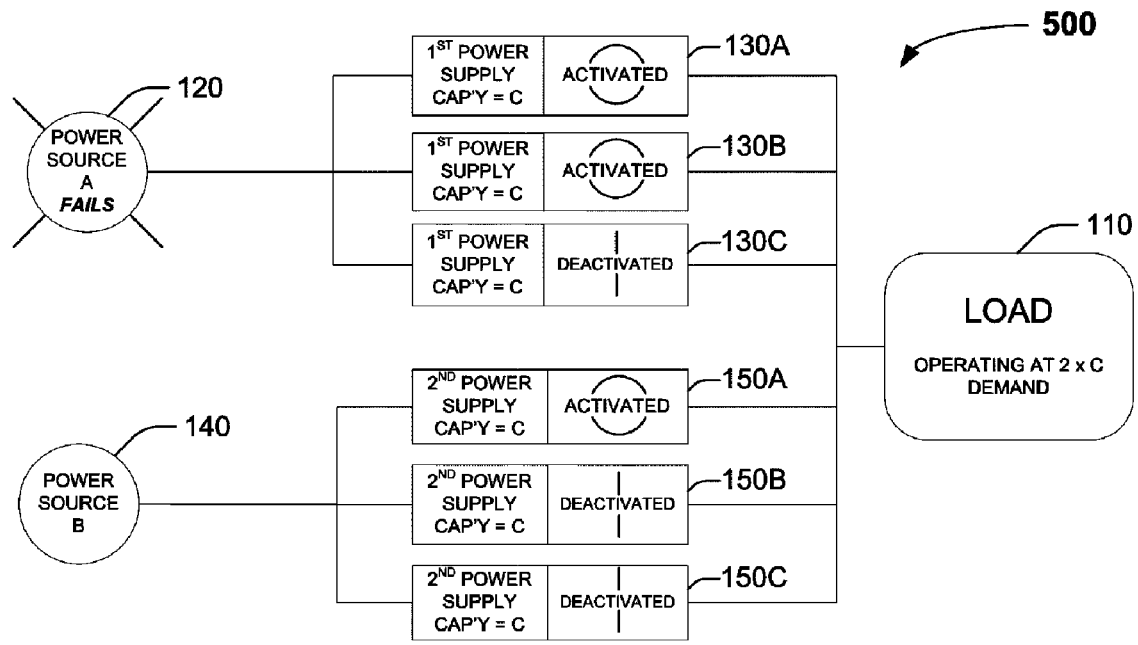
FIG. 5 depicts an illustrative N+1 redundant power supply system with an illustrative source failure, according to one or more embodiments described herein.
Figure 5A:
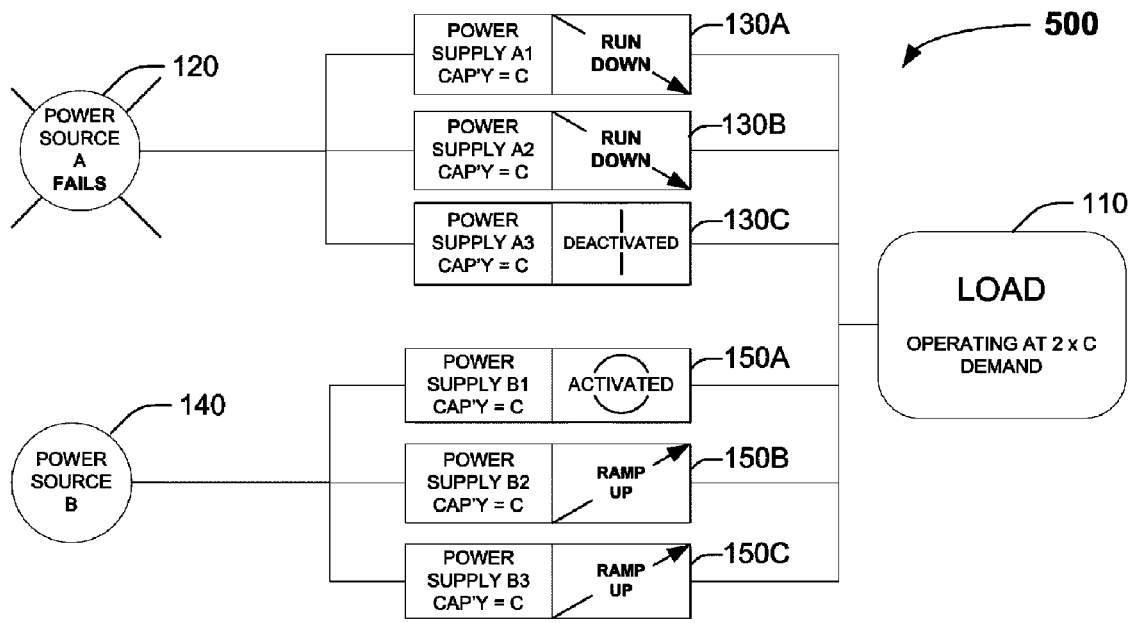
FIG. 5A depicts the illustrative N+1 redundant power supply system depicted in FIG. 5 responding to the source failure, according to one or more embodiments described herein.

FIG. 5 depicts an illustrative "N+1" redundant power supply system 500 with an illustrative first source 120 failure, according to one or more embodiments. FIG. 5A depicts the illustrative "N+1" redundant power supply system 500 depicted in FIG. 5 responding to the first source 120 failure, according to one or more embodiments. FIGS. 5 and 5A depict three first power supplies 130A, 130B, and 130C, each having a capacity of "C" and three second power supplies 150A, 150B, and 150C, each also having a capacity of "C" coupled to a load 110 having a maximum power demand of "3C." Using an "N+1" redundancy arrangement, and assuming dynamic power savings are employed, when the load 110 is operating at a power demand of "2C," two first power supplies 130A and 130B and one second power supply 150A can be activated by the controller 160. Under the "N+1" redundancy arrangement depicted in FIG. 5, one first power supply 130C and two second power supplies 150B and 150C can be deactivated by the controller 160 (not shown).

Upon an unacceptable fluctuation in one or more parameters in the first source 120, e.g. unacceptable voltage, current, or frequency deviations, one or more signals will be transmitted or otherwise communicated from the first power supplies 130A and 130B to the controller 160. Referring to FIG. 5A, upon loss of the first source 120, the first power supplies 130A and 130B will begin to ramp down. The controller 160 can transmit or otherwise communicate one or more activation signals to the deactivated second power supplies 150B and 150C. The second power supplies 150B and 150C can "ramp up" while the first power supplies 130A and 130B are "ramping down" due to the failure of the first source 120.

Figure 3:
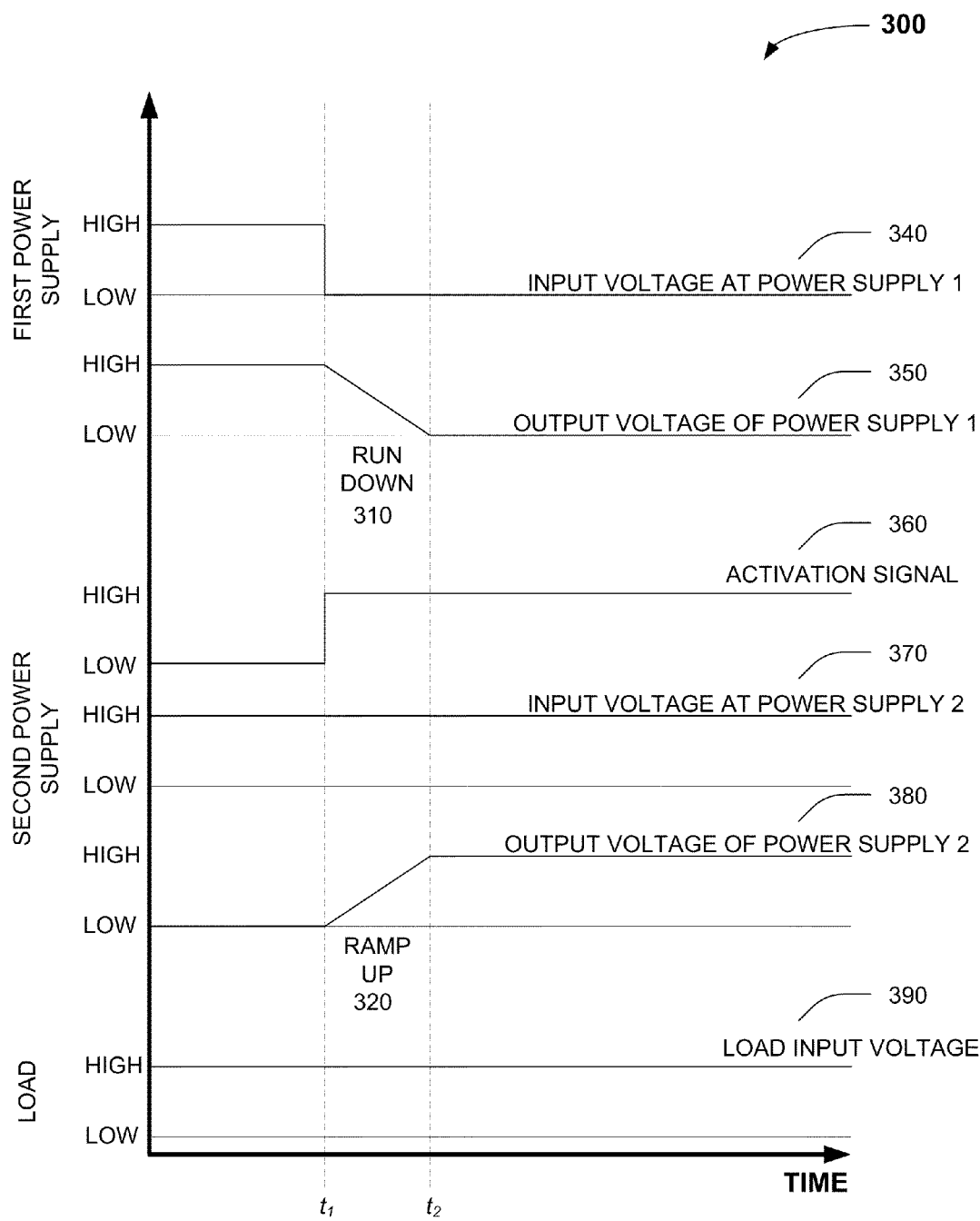
FIG. 3 depicts an illustrative timing diagram for an exemplary redundant power supply system, according to one or more embodiments described herein.

As previously discussed in detail with regards to FIGS. 2 and 3, as depicted in FIG. 5A, the power supplied to the load 110 remains sufficient at all times, supplied by the first power supplies 130A and 130B and second power supplies 150B and 150C as the first power supplies 130A, 130B are "running-down" and the second power supplies 150B, 150C are "ramping-up." After the first power supplies 130A and 130B complete their run-down, the power supplied to the load 110 can be completely supplied by the second power supplies 150A, 150B, and 150C.

Certain embodiments and features have been described above using one or more sets of numerical limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

While the foregoing is directed to embodiments of the present invention, other and further embodiments of the invention may be devised without departing from the basic scope thereof, and the scope thereof is determined by the claims that follow.

What is claimed is:

1. A power supply method, comprising:
communicatively coupling a load to a first source via a plurality of first power supplies;
communicatively coupling the load to a second source via a plurality of second power supplies;
bidirectionally communicatively coupling a controller to the plurality of first power supplies and to the plurality of second power supplies;
activating, via the controller, a first portion of the plurality of first power supplies to supply power to the load, wherein the controller determines the number ("N") of first power supplies activated;
activating, via the controller, at least one of the plurality of second power supplies to supply power to the load;
monitoring, via the controller, for at least one fault condition in each of the active first power supplies; and
monitoring, via the controller, for at least one fault condition in each of the active second power supplies.

2. The method of claim 1, further comprising:
transmitting a signal comprising an input fault signal, from one or more first power supplies to the controller;
transmitting at least one activation signal from the controller to at least N−1 deactivated second power supplies;
transitioning the at least N−1 second power supplies from the deactivated state to the active state.

3. The method of claim 2 wherein each of the power supplies forming the plurality of first power supplies and each of the power supplies forming the plurality of second power supplies has an activation to deactivation ("run-down") transition time;
wherein each of the power supplies forming the plurality of first power supplies and each of the power supplies forming the plurality of second power supplies has a deactivation to activation ("ramp-up") transition time;
wherein the ramp-up transition time is less than or equal to the run-down transition time.

4. The method of claim 1, further comprising:
transmitting a signal comprising an output fault signal from one or more active first power supplies to the controller;
transmitting at least one activation signal from the controller to at least one deactivated second power supply;
transitioning the at least one deactivated second power supply from the deactivated state to the active state.

5. The method of claim 1, further comprising:
transmitting a signal comprising an output fault signal from one or more active second power supplies to the controller;
transmitting at least one activation signal from the controller to at least one deactivated second power supply;
transitioning the at least one deactivated second power supply from the deactivated state to the active state.

6. The method of claim 1, further comprising:
transmitting a signal comprising an output fault signal from one or more active first power supplies to the controller;
transmitting at least one activation signal from the controller to at least one deactivated first power supply;
transitioning the at least one deactivated first power supply from the deactivated state to the active state.

7. The method of claim 1, further comprising:
transmitting a load power demand signal from the load to the controller;
transmitting one or more activation and deactivation signals from the controller to at least one first power supply in response to changes in the load power consumption.

8. A power supply method, comprising:
communicatively coupling a first source to a plurality of first power supplies;
communicatively coupling a second source to a plurality of second power supplies;
communicatively coupling at least one controller to the plurality of first power supplies and the plurality of second power supplies;
wherein the communicative coupling between each of the first power supplies forming the plurality of first power supplies, each of the second power supplies forming the plurality of second power supplies, and the at least one controller comprises:
an input failure signal;
an output failure signal;
an activation signal, adapted to transition the power supply from a deactivated state to an activated state; and
a deactivation signal, adapted to transition the power supply from an activated state to a deactivated state;
monitoring, via the controller, for a power supply input failure signal or a power supply output failure signal from each of the first power supplies forming the plurality of first power supplies, and each of the second power supplies forming the plurality of second power supplies;
responding, via the controller, upon receipt of a power supply input failure signal from at least one first power supply, wherein the response comprises:
transmitting a power supply activation signal to at least a portion of the plurality of second power supplies; and
transmitting a power supply deactivation signal to the plurality of first power supplies; and
responding, via the controller, upon receipt of a power supply output failure signal from at least one first power supply, wherein the response comprises:
transmitting a power supply activation signal to at least a portion of the plurality of second power supplies; and transmitting a power supply deactivation signal to the at least one first power supply generating the power supply output failure signal.

9. The method of claim 8 wherein each of the first power supplies forming the plurality of first power supplies and each of the second power supplies forming the plurality of second power supplies has an activation to deactivation ("run-down") transition time in the event of an input failure;
   wherein each of the first power supplies forming the plurality of first power supplies and each of the second power supplies forming the plurality of second power supplies has a deactivation to activation ("ramp-up") transition time; and
   wherein the ramp-up transition time is less than or equal to the run-down transition time.

10. The method of claim 8, further comprising:
   communicatively coupling a load to at least a portion of the plurality of first power supplies;
   communicatively coupling the load to at least a portion of the plurality of second power supplies; and
   communicatively coupling the load to the controller, wherein the communicative coupling between the load and the at least one controller comprises a signal indicative of the power demand of the load.

11. The method of claim 10, further comprising:
   responding, via the controller, to a change in load power demand, wherein the response comprises:
      transmitting a power supply activation signal to at least a portion of the plurality of first power supplies in response to an increase in load power demand; and
      transmitting a power supply deactivation signal to at least a portion of the plurality of first power supplies in response to a decrease in load power demand.

* * * * *